United States Patent
Lechner et al.

(10) Patent No.: US 12,351,174 B2
(45) Date of Patent: Jul. 8, 2025

(54) DRIVER ASSISTANCE SYSTEM FOR THE AUTOMATED LONGITUDINAL GUIDANCE OF A MOTOR VEHICLE

(71) Applicant: Bayerische Motoren Werke Aktiengesellschaft, Munich (DE)

(72) Inventors: Andreas Lechner, Munich (DE); Stefan Treml, Hebertshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 145 days.

(21) Appl. No.: 18/008,567

(22) PCT Filed: Apr. 26, 2021

(86) PCT No.: PCT/EP2021/060773
§ 371 (c)(1),
(2) Date: Dec. 6, 2022

(87) PCT Pub. No.: WO2021/249687
PCT Pub. Date: Dec. 16, 2021

(65) Prior Publication Data
US 2023/0227038 A1    Jul. 20, 2023

(30) Foreign Application Priority Data
Jun. 8, 2020  (DE) .................. 10 2020 115 114.4

(51) Int. Cl.
*B60W 60/00* (2020.01)
*B60W 30/18* (2012.01)
(Continued)

(52) U.S. Cl.
CPC ...... *B60W 30/18009* (2013.01); *B60W 40/06* (2013.01); *B60W 50/10* (2013.01); *B60W 60/001* (2020.02); *B60W 2552/05* (2020.02)

(58) Field of Classification Search
CPC .......... B60W 30/18009; B60W 40/06; B60W 50/10; B60W 60/001; B60W 2552/05;
(Continued)

(56) References Cited

U.S. PATENT DOCUMENTS

2010/0191436 A1*  7/2010  Hellmann ........... B60W 30/146
                                                         701/96
2017/0015319 A1*  1/2017  Knoller ............. B60W 50/0097
(Continued)

FOREIGN PATENT DOCUMENTS

DE   10 2005 014 309 A1   10/2006
DE   10 2007 018 665 A1   10/2008
(Continued)

OTHER PUBLICATIONS

International Search Report (PCT/ISA/210) issued in PCT Application No. PCT/EP2021/060773 dated Jul. 6, 2021 with English translation (five (5) pages).
(Continued)

*Primary Examiner* — Peter D Nolan
*Assistant Examiner* — Chanmin Park
(74) *Attorney, Agent, or Firm* — Crowell & Moring LLP

(57) ABSTRACT

A driver assistance system for automated longitudinal guidance of a motor vehicle configured to detect at least one turning opportunity for the motor vehicle, and to reduce the speed of the motor vehicle in accordance with the at least one detected turning opportunity.

12 Claims, 2 Drawing Sheets

(51) Int. Cl.
*B60W 40/06* (2012.01)
*B60W 50/10* (2012.01)

(58) Field of Classification Search
CPC ..... B60W 30/18154; B60W 2050/006; B60W 2540/20; B60W 2552/10; B60W 30/18145; B60W 30/143
See application file for complete search history.

(56) References Cited

U.S. PATENT DOCUMENTS

| | | |
|---|---|---|
| 2018/0164817 A1 | 6/2018 | Herz et al. |
| 2018/0292829 A1 | 10/2018 | Li |
| 2019/0031174 A1 | 1/2019 | Adachi |

FOREIGN PATENT DOCUMENTS

| | | |
|---|---|---|
| DE | 10 2016 216 134 A1 | 3/2018 |
| DE | 10 2018 117 804 A1 | 1/2019 |
| DE | 10 2018 209 913 A1 | 12/2019 |

OTHER PUBLICATIONS

German-language Written Opinion (PCT/ISA/237) issued in PCT Application No. PCT/EP2021/060773 dated Jul. 6, 2021 (five (5) pages).

German-language Search Report issued in German Application No. 10 2020 115 114.4 dated Mar. 2, 2021 with partial English translation (10 pages).

"Rechtsfolgen zunehmender Fahrzeugautomatisierung", Bundesanstalt fuer Strassenwesen (BASt) [German Federal Highway Research Institute], Forschung kompakt [Research News], Edition Nov. 2012 with English Abstract (two (2) pages).

"(R) Taxonomy and Definitions for Terms Related to Driving Automation Systems for On-Road Motor Vehicles", Surface Vehicle Recommended Practice, SAE (Society of Automotive Engineering) International, J3016TM, Sep. 2016, pp. 1-30 (30 pages).

* cited by examiner

DRIVER ASSISTANCE SYSTEM FOR THE AUTOMATED LONGITUDINAL GUIDANCE OF A MOTOR VEHICLE

BACKGROUND AND SUMMARY

The invention relates to a driver assistance system and to a method for the automated longitudinal guidance of a motor vehicle.

The term "automated driving" can be understood within the scope of the document as meaning driving with automated longitudinal or transverse guidance or autonomous driving with automated longitudinal and transverse guidance. The term "automated driving" comprises automated driving with any desired level of automation. Examples of levels of automation include assisted, partially automated, highly automated or fully automated driving. These levels of automation have been defined by the Federal Highway Research Institute (BASt) (see BASt publication "*Forschung kompakt* [Compact research]", issued November/2012). During assisted driving, the driver continuously carries out the longitudinal or transverse guidance while the system takes over the respective other function within certain limits. During partially automated driving (TAF), the system takes over the longitudinal and transverse guidance for a certain period of time and/or in specific situations, with the driver having to continuously monitor the system, as for assisted driving. In highly automated driving (HAF), the system takes over the longitudinal and transverse guidance for a certain period of time without the driver having to continuously monitor the system; however, the driver has to be capable of taking over the vehicle guidance within a certain time. In fully automated driving (VAF), the system can automatically handle the driving in all situations for a specific application; for this application, a driver is no longer required. The abovementioned four levels of automation according to the BASt definition correspond to SAE levels 1 to 4 of the standard SAE J3016 (SAE—Society of Automotive Engineering). For example, the highly automated driving (HAF) according to BASt corresponds to level 3 of the standard SAE J3016. Furthermore, SAE level 5 which is not contained in the definition of BASt is provided as the highest level of automation in SAE J3016. SAE level 5 corresponds to driverless driving, in which the system can automatically handle all situations like a human driver throughout the entire journey; a driver is generally no longer required.

A driver assistance system for the automated longitudinal guidance conventionally does not have any information regarding the route envisaged by the driver of the motor vehicle. The behavior of conventional driver assistance systems for the automated longitudinal guidance is therefore highly uncomfortable if the route envisaged by the driver of the motor vehicle requires a turning-off operation.

It is the object of the invention to make the behavior of a driver assistance system for the automated longitudinal guidance more comfortable if the route envisaged by the driver of the motor vehicle requires a turning-off operation.

The object is achieved by the features described herein. Advantageous embodiments are also described herein. It is pointed out that additional features of a patent claim dependent on an independent patent claim can form a separate invention independent of the combination of all of the features of the independent patent claim without the features of the independent patent claim or only in combination with a subset of the features of the independent patent claim, the separate invention being able to be turned into the subject matter of an independent claim, a divisional application or a subsequent application. This applies in the same way to technical teachings described in the description, which are able to form an invention independent of the features of the independent patent claims.

A first aspect of the invention relates to a driver assistance system for the automated longitudinal guidance of a motor vehicle, wherein the driver assistance system in particular takes over only the longitudinal guidance of the motor vehicle and not the transverse guidance of the motor vehicle. Alternatively thereto, the driver assistance system according to the invention takes over in particular also the transverse guidance of the motor vehicle. The invention is based here on the finding that the objective mentioned is independent of whether the driver assistance system takes over the longitudinal guidance of the motor vehicle exclusively or additionally also the transverse guidance of the motor vehicle.

The driver assistance system is designed to detect at least one turning-off possibility for the motor vehicle, i.e., for example, a junction, an entrance, an entrance ramp or an exit.

In addition, the driver assistance system is designed to reduce the speed of the motor vehicle in accordance with the at least one detected turning-off possibility.

In particular, the driver assistance system is designed to reduce the speed of the motor vehicle in accordance with the position of the turning-off possibility or in accordance with the distance of the motor vehicle from the turning-off possibility.

In addition, the driver assistance system is designed in particular to reduce the speed of the motor vehicle after detection of the turning-off possibility, i.e., for example, directly upon detecting the turning-off possibility or only later, but before reaching the turning-off possibility.

In an advantageous embodiment of the invention, the driver assistance system is designed to detect at least one turning-off possibility for the motor vehicle in a partial region of the driving route located in front of the motor vehicle in the direction of travel, i.e. in a part of the route driven on in future by the motor vehicle, and to reduce the speed of the motor vehicle in accordance with the at least one detected turning-off possibility.

In an advantageous embodiment of the invention, the driver assistance system is designed to determine a first end of the partial region in accordance with a first predefined deceleration of the vehicle.

The first end of the partial region is in particular that end of the partial region which is located closer to the motor vehicle and thus, from looking from the motor vehicle, is the beginning of the partial region.

The invention is based here on the finding that, for reasons of comfort for the occupants of the motor vehicle and in view of the traffic behind, the motor vehicle is intended to decelerate only with an upwardly limited maximum deceleration before a turning-off operation. It is therefore possible, from the current position of the motor vehicle, the current speed of the motor vehicle and the maximum desired deceleration, to determine a geographical location at which the turning-off operation should take place at the earliest.

The first predefined deceleration of the vehicle is in particular the upwardly limited maximum deceleration, for example $-1.5$ m/s$^2$. In particular, the driver assistance system is designed to determine a first end of the partial region in accordance with a first predefined deceleration of the vehicle, which is dependent on the speed of the motor vehicle.

For example, the first predefined deceleration of the vehicle is $-1.5$ m/s$^2$ at a speed of 14 km/h, $-2$ m/s$^2$ at a speed of 30 km/h, and $-2.3$ m/s$^2$ at a speed of 39 km/h.

If the speed lies between two of the values mentioned, the first predefined deceleration of the vehicle can be linearly interpolated, for example, between the decelerations assigned to the speeds. If the speed lies below the smallest or above the greatest of the values mentioned, the smallest or the greatest of the values mentioned can be used for the first predefined deceleration of the vehicle.

In a further advantageous embodiment of the invention, the driver assistance system is designed to determine a second end of the partial region in accordance with a second predefined deceleration of the vehicle. The second predefined deceleration of the vehicle is, for example, $-0.25$ m/s$^2$ or $-0.5$ m/s$^2$.

The second end of the partial region is in particular that end of the partial region which is located further away from the motor vehicle and which therefore from looking from the motor vehicle is the end of the partial region.

It is also possible with the second predefined deceleration of the vehicle to determine a geographical location from the current position of the motor vehicle, the current speed of the motor vehicle and the second predefined deceleration of the vehicle.

The second predefined deceleration of the vehicle is used in particular only for determining the second end of the partial region. Although it can actually also be used for the deceleration of the motor vehicle, this does not necessarily have to take place since a more comfortable driving sensation arises for the driver of the motor vehicle if the motor vehicle before a turning-off possibility travels for a longer time with an unchanged speed and then decelerates more greatly than the second predefined deceleration of the vehicle.

In a further advantageous embodiment of the invention, the driver assistance system is designed to detect at least two turning-off possibilities for the motor vehicle, in particular in the above-described partial region of the driving route lying in front of the motor vehicle in the direction of travel.

In addition, the driver assistance system is designed to select one of the at least two turning-off possibilities for the motor vehicle, and to reduce the speed of the motor vehicle in accordance with the selected turning-off possibility.

In a further advantageous embodiment of the invention, the driver assistance system is designed to determine a type of road for each of the at least two turning-off possibilities for the motor vehicle, and to select one of the at least two turning-off possibilities in accordance with their respective types of road.

A system of types of road may be predefined legally, for example. For example, the road traffic act in Germany identifies the following types of road: freeway, roads similar to freeways, main highway, roads outside built-up areas, roads inside built-up areas.

However, the system of types of road may also be predefined or supplemented by further parameters, e.g. permitted maximum speed, road width or number of traffic lanes.

In particular, the system of types of road predefines a prioritization of the individual types of road, and therefore the driver assistance system is designed, for example, to select the turning-off possibility with the highest priority.

In a further advantageous embodiment of the invention, the driver assistance system is designed to determine a value for the type of road of each of the at least two turning-off possibilities for the motor vehicle, and to select the one of the at least two turning-off possibilities having the highest value.

This value can result, for example, from the abovementioned system of types of road. Alternatively, the value may also result, for example, from other data, such as, for example, navigation data, including measured volume of traffic or determined average speed.

In a further advantageous embodiment of the invention, the driver assistance system is designed to detect a turning-off request of a driver of the motor vehicle during operation of the motor vehicle with automated longitudinal guidance, and to reduce the speed of the motor vehicle in accordance with the detected turning-off request.

In particular, the driver assistance system is designed to detect the turning-off request in accordance with the teaching of the third and/or fourth aspect of the invention.

A fourth aspect of the invention relates to a method for the automated longitudinal guidance of a motor vehicle.

One step of the method comprises detecting at least one turning-off possibility for the motor vehicle.

A further step of the method comprises reducing the speed of the motor vehicle in accordance with the at least one detected turning-off possibility.

A third aspect of the invention relates to a driver assistance system for the automated longitudinal guidance of a motor vehicle. In particular, the driver assistance system according to the invention does not take over the transverse guidance of the motor vehicle. As an alternative thereto, the driver assistance system according to the invention also takes over the transverse guidance of the motor vehicle. The invention is based here on the finding that the objective mentioned is independent of whether the driver assistance system takes over the longitudinal guidance of the motor vehicle exclusively or additionally also the transverse guidance of the motor vehicle.

The driver assistance system is designed to detect a turning-off request of the driver of the motor vehicle during operation of the motor vehicle with automated longitudinal guidance, and to reduce the speed of the motor vehicle in accordance with the detected turning-off request.

In particular, the driver assistance system is designed to reduce the speed of the motor vehicle at the earliest when a turning-off request is detected. For example, the driver assistance system is designed to reduce the speed of the motor vehicle at the time of detection of the turning-off request, or to reduce the speed of the motor vehicle only at a later time.

In an advantageous embodiment of the invention, the driver assistance system is designed to detect an activation of a direction of travel indicator of the motor vehicle, in particular by evaluating an actuation of an activation switch for the direction of travel indicator by the driver of the motor vehicle.

The driver assistance system is also designed in particular to detect which direction of travel indicator is activated, i.e. whether the right direction of travel indicator or the left direction of travel indicator is activated.

The driver assistance system is designed to detect the turning-off request of the driver in accordance with the activation of the direction of travel indicator. In other words, the turning-off request of the driver is detected if the direction of travel indicator is activated. A turning-off request to the left is detected, for example, if the left direction of travel indicator is activated, and a turning-off request to the right is detected, for example, if the right direction of travel indicator is activated.

In particular if the activation switch for the direction of travel indicator can be activated in multiple stages, for example by means of a tapping and a latching stage, the driver assistance system is designed to detect the turning-off request of the driver only in the event at least of the second stage of the activation switch, i.e., for example, in the latching stage.

In a further advantageous embodiment of the invention, the driver assistance system is designed to determine a number of traffic lanes on a directional roadway driven on by the motor vehicle, and to detect the turning-off request of the driver in accordance with the number of determined traffic lanes.

A roadway serves as a traffic area and is composed of the individual traffic lanes. A directional roadway serves only for traffic in one direction of travel.

The traffic lane (also called lane) identifies the area which is available to a vehicle for traveling in one direction.

The invention is based here, for example, on the finding that, when driving on a directional roadway with more than one traffic lane, a lane change is also possible in addition to the turning-off operation, and therefore a turning-off request of the driver should be differentiated from a lane change request of the driver.

In a further advantageous embodiment of the invention, the directional roadway driven on by the motor vehicle comprises precisely one traffic lane.

In this case, the driver assistance system is designed to detect an activation of a direction of travel indicator of the motor vehicle, and to detect the turning-off request of the driver in accordance with the activation of the direction of travel indicator.

If, therefore, for example, the motor vehicle is on a directional roadway which comprises only one traffic lane, the turning-off request is detected in accordance with the activation of the direction of travel indicator, i.e., for example, directly upon activation of the direction of travel indicator by the driver of the motor vehicle.

In a further advantageous embodiment of the invention, the directional roadway driven on by the motor vehicle comprises more than one traffic lane, i.e., for example, two or three traffic lanes.

Additional difficulties in this case include, for example, that a lane change request of the driver of the motor vehicle may also be present in addition to the turning-off request of the driver of the motor vehicle, and/or that the different traffic lanes provide different turning-off possibilities because of the traffic regulations in force.

In this case, the driver assistance system is designed to determine a traffic lane driven on by the motor vehicle, and to determine the turning-off request of the driver in accordance with the traffic lane (FS1) driven on by the motor vehicle (KFZ).

In particular, the driver assistance system is designed to detect an activation of a direction of travel indicator of the motor vehicle, and to establish the turning-off request of the driver if the traffic lane driven on by the motor vehicle permits turning off in the direction of the activated direction of travel indicator.

That is to say, if, for example, the left direction of travel indicator is activated and the motor vehicle is in a left traffic lane, the turning-off request of the driver is then established. If, on the other hand, the right direction of travel indicator is activated and the motor vehicle is in a left traffic lane, no turning-off request of the driver is then established. Possibly, in this case, a lane change request of the driver of the motor vehicle is present.

In particular, the driver assistance system is designed to detect an activation of a direction of travel indicator of the motor vehicle, and to establish the turning-off request of the driver if the traffic lane driven on by the motor vehicle permits turning off in the direction of the activated direction of travel indicator, for example even if the traffic lane driven on by the motor vehicle permits driving in a plurality of directions (i.e., for example, turning off and driving straight ahead), and/or if a plurality of traffic lanes permit turning off in the same direction.

In a further advantageous embodiment of the invention, the directional roadway driven on by the motor vehicle comprises more than one traffic lane, and the driver assistance system is not capable of determining a traffic lane driven on by the motor vehicle.

This is the case, for example, if the sensors used for locating the motor vehicle cannot produce sufficiently accurate data.

In this case, the driver assistance system is designed to detect an activation of a direction of travel indicator of the motor vehicle, and to determine or to establish the turning-off request of the driver if the direction of travel indicator is activated for longer than a predefined period of time. This predefined period of time is 3 s, for example.

In a further advantageous embodiment of the invention, the driver assistance system is designed to detect an activation of a direction of travel indicator of the motor vehicle, to detect a traffic lane change of the motor vehicle following the activation of the direction of travel indicator, and after the traffic lane change to detect the turning-off request of the driver in accordance with the activation of the direction of travel indicator.

In particular, the driver assistance system is designed to detect a traffic lane change by being designed to check whether a reference point of the motor vehicle, for example a central point of a rear axle of the motor vehicle, exceeds a separating line between two traffic lanes.

In a further advantageous embodiment of the invention, the driver assistance system is designed to detect the turning-off request of the driver if the direction of travel indicator after the traffic lane change is still activated for longer than a predefined period of time, for example for a further 3 s or 5 s.

In a further advantageous embodiment, the driver assistance system is designed to detect the turning-off request of the driver if the direction of travel indicator is deactivated by the driver of the motor vehicle after the traffic lane change and is then activated again.

In a further advantageous embodiment of the invention, the driver assistance system is designed to detect a turning-off possibility for the motor vehicle, and to reduce the speed of the motor vehicle in accordance with the detected turning-off possibility.

In particular, the driver assistance system is designed to detect the turning-off possibility in accordance with the teaching of the first and/or second aspect of the invention.

A fourth aspect of the invention relates to a method for the automated longitudinal guidance of a motor vehicle.

One step of the method comprises detecting a turning-off request of the driver of the motor vehicle during operation of the motor vehicle with automated longitudinal guidance.

A further step of the method is reducing the speed of the motor vehicle when a turning-off request is detected.

The invention is described below on the basis of an exemplary embodiment with the assistance of the attached drawings.

DETAILED DESCRIPTION

Figure 1:
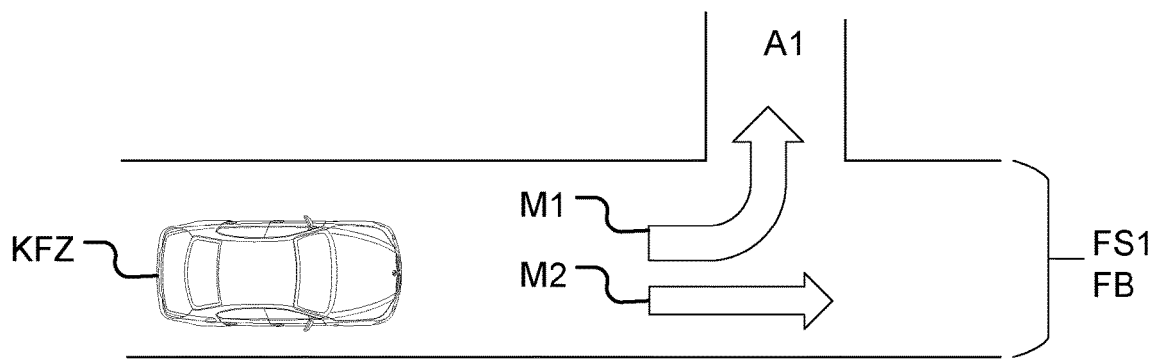
FIG. 1 shows an exemplary embodiment of the invention.

FIG. 1 shows an exemplary embodiment of a driver assistance system for the automated longitudinal guidance of a motor vehicle KFZ.

The driver assistance system is designed here to detect a turning-off request of the driver of the motor vehicle KFZ during operation of the motor vehicle KFZ with automated longitudinal guidance.

The turning-off request of the driver of the motor vehicle KFZ describes a request of the driver of the motor vehicle KFZ at a position which provides the driver with two or more possibilities M1, M2 for further travel, one thereof, e.g. M2, indicating remaining in the current traffic lane FS1 and the other, e.g. M1, indicating turning off from the current traffic lane FS1 at a turning-off possibility A1.

In addition, the driver assistance system is designed to reduce the speed of the motor vehicle KFZ in accordance with the detected turning-off request.

In particular, for this purpose, the driver assistance system is designed to detect an activation of a direction of travel indicator of the motor vehicle KFZ and to determine a number of traffic lanes FS1 on a directional roadway FB driven on by the motor vehicle KFZ.

If the directional roadway FB driven on by the motor vehicle KFZ, as shown in FIG. 1, comprises only one traffic lane FS1, the driver assistance system is designed to detect the turning-off request of the driver in accordance with the activation of the direction of travel indicator.

Figure 2:
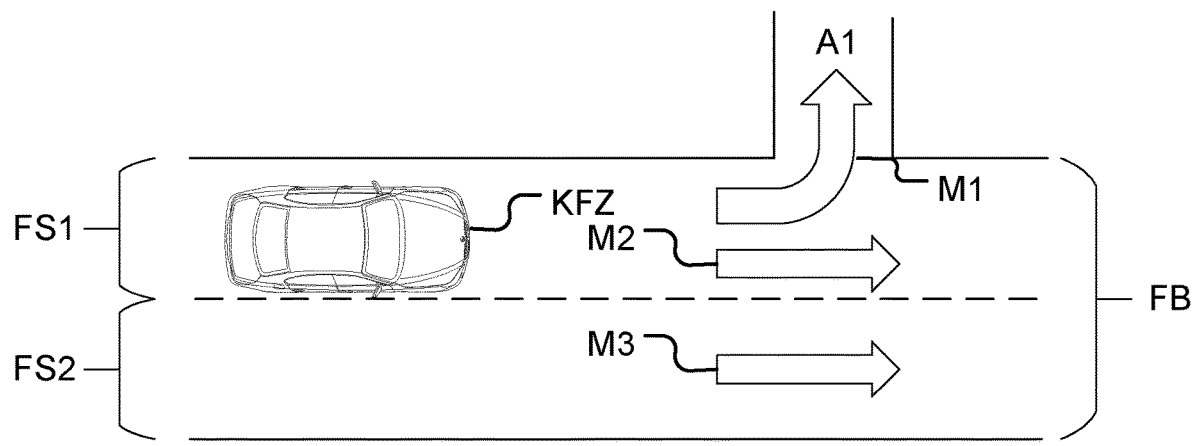
FIG. 2 shows a further exemplary embodiment of the invention.

FIG. 2 shows a further exemplary embodiment of a driver assistance system for the automated longitudinal guidance of a motor vehicle KFZ.

The driver assistance system is designed here to detect a turning-off request of the driver of the motor vehicle KFZ during operation of the motor vehicle KFZ with automated longitudinal guidance, wherein, in the present example, the directional roadway FB driven on by the motor vehicle comprises more than one traffic lane FS1, FS2, namely two traffic lanes.

Traffic lane FS1 provides two possibilities M1, M2 here for further travel, of which M1 indicates turning off from the traffic lane FS1 at the turning-off possibility A1.

Traffic lane FS2 provides only one possibility M3 for further travel, namely remaining on the directional roadway FB.

The driver assistance system is designed to determine a traffic lane FS1 driven on by the motor vehicle KFZ, and to determine the turning-off request of the driver in accordance with the traffic lane FS1 driven on by the motor vehicle KFZ.

If, for example, the driver of the motor vehicle KFZ actuates an operating element, e.g. an indicator lever, in a manner such that the indicator lever could suggest, inter alia, a turning-off request to the left, in this case the driver assistance system will determine or establish the turning-off request of the driver since turning off to the left at the turning-off possibility A1 is possible in the current traffic lane FS1 of the motor vehicle KFZ.

If, on the other hand, the driver assistance system were not capable of determining the traffic lane FS1 driven on by the motor vehicle KFZ, the driver assistance system could nevertheless determine the turning-off request of the driver by the driver assistance system being designed to detect an activation of a direction of travel indicator of the motor vehicle KFZ and to determine the turning-off request of the driver if the direction of travel indicator is activated for longer than a predefined period of time.

Figure 3:
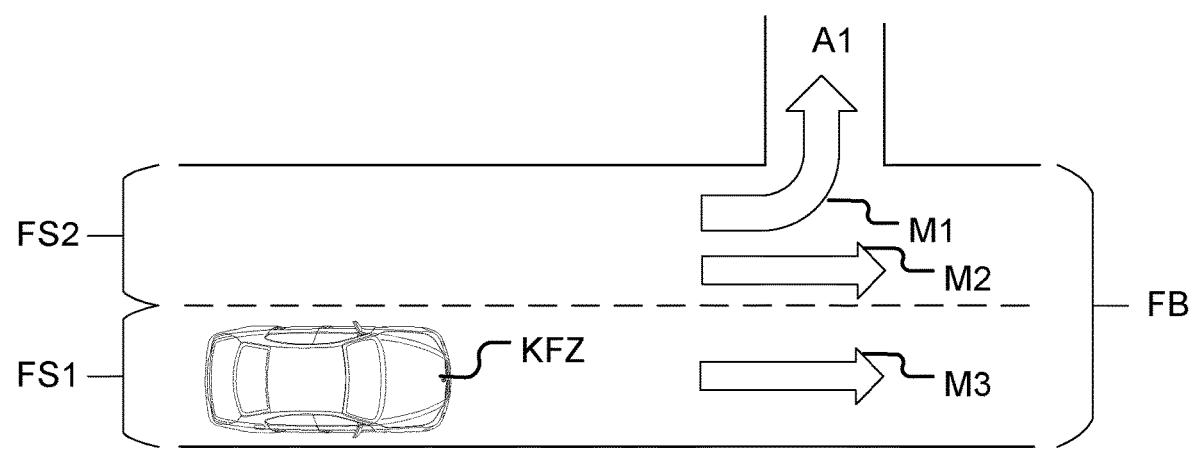
FIG. 3 shows a further exemplary embodiment of the invention.

FIG. 3 shows a further exemplary embodiment of a driver assistance system for the automated longitudinal guidance of a motor vehicle KFZ.

The driver assistance system is designed here to detect a turning-off request of the driver of the motor vehicle KFZ during operation of the motor vehicle KFZ with automated longitudinal guidance, wherein, in the present example, the directional roadway FB driven on by the motor vehicle comprises more than one traffic lane FS1, FS2, namely two traffic lanes.

Traffic lane FS2 provides two possibilities M1, M2 here for further travel, of which M1 indicates turning off from the traffic lane FS2 at the turning-off possibility A1.

Traffic lane FS1 provides only one possibility M3 for further travel, namely remaining on the directional roadway FB.

The driver assistance system is designed to determine a traffic lane FS1 driven on by the motor vehicle KFZ, and to determine the turning-off request of the driver in accordance with the traffic lane FS1 driven on by the motor vehicle KFZ.

If, for example, the driver of the motor vehicle KFZ actuates an operating element, e.g. an indicator lever, in a manner such that the indicator lever could suggest, inter alia, a turning-off request to the left, in this case the driver assistance system will not determine or establish a turning-off request of the driver since turning off to the left is not possible in the current traffic lane FS1 of the motor vehicle KFZ.

If, however, the motor vehicle KFZ in this case were to change from traffic lane FS1 to traffic lane FS2, turning off to the left would be possible.

For this case, the driver assistance system is designed in particular to detect an activation of a direction of travel indicator of the motor vehicle KFZ, to detect a traffic lane change of the motor vehicle KFZ following the activation of the direction of travel indicator, and, after the traffic lane change, to detect the turning-off request of the driver in accordance with the activation of the direction of travel indicator, for example by the driver assistance system being designed to detect the turning-off request of the driver if the direction of travel indicator after the traffic lane change is still activated for longer than a predefined period of time.

Figure 4:
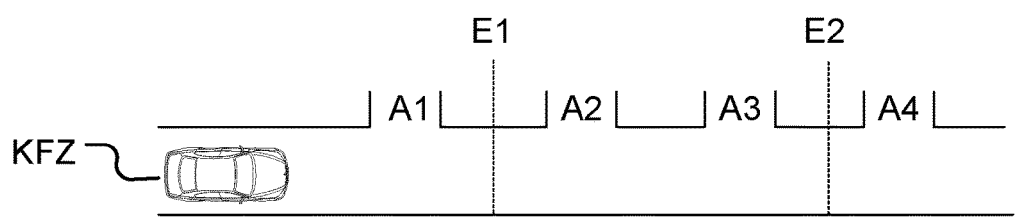
FIG. 4 shows a further exemplary embodiment of the invention.

FIG. 4 shows a further exemplary embodiment of a driver assistance system for the automated longitudinal guidance of a motor vehicle KFZ.

The driver assistance system is designed here to detect at least one turning-off possibility A1-A4 for the motor vehicle KFZ, and to reduce the speed of the motor vehicle KFZ depending on the at least one detected turning-off possibility A1-A4.

In particular, the driver assistance system is designed to detect an activation of a direction of travel indicator of the motor vehicle KFZ, to detect a turning-off request of the driver depending on the activation of the direction of travel indicator, and then to detect the at least one turning-off possibility A1-A4 for the motor vehicle KFZ.

In an advantageous manner, the driver assistance system is designed to determine a partial region of the driving route lying in front of the motor vehicle KFZ in the direction of travel, wherein the driver assistance system is designed to determine a first end E1 of the partial region in accordance with a first predefined deceleration of the vehicle and a second end E2 of the partial region in accordance with a second predefined deceleration of the vehicle.

In addition, the driver assistance system is designed to detect at least one turning-off possibility A2, A3 for the motor vehicle KFZ in the partial region of the driving route lying in front of the motor vehicle KFZ in the direction of travel, and to reduce the speed of the motor vehicle KFZ in accordance with the at least one detected turning-off possibility A2, A3.

In order to reduce the speed of the motor vehicle KFZ, the driver assistance system is designed to select one of the at least two turning-off possibilities A2, A3 in the partial region, and to reduce the speed of the motor vehicle KFZ in accordance with the selected turning-off possibility.

The selection can be undertaken, for example, by a type of road being determined for each of the at least two turning-off possibilities A2, A3 for the motor vehicle KFZ, and one of the at least two turning-off possibilities A2, A3 being selected in accordance with their respective types of road.

The invention claimed is:

1. A driver assistance system for automated longitudinal guidance of a motor vehicle, the driver assistance system configured to:
   detect at least one turning-off possibility for the motor vehicle in a partial region of a driving route lying in front of the motor vehicle in a direction of travel of the motor vehicle;
   determine a location of a first end of the partial region dependent on a first predefined vehicle deceleration rate;
   determine a location of a second end of the partial region dependent on a second predefined vehicle deceleration rate different from the first predefined vehicle deceleration rate; and
   decrease a speed of the motor vehicle in a manner that is dependent on the at least one detected turning-off possibility.

2. The driver assistance system according to claim 1, further configured to:
   detect at least two turning-off possibilities for the motor vehicle; and
   select one of the at least two turning-off possibilities for the motor vehicle as the at least one detected turning-off possibility.

3. The driver assistance system according to claim 2, further configured to:
   determine a road type for each of the at least two turning-off possibilities for the motor vehicle; and
   select the one of the at least two turning-off possibilities dependent on the respective road types of the at least two turning-off possibilities.

4. The driver assistance system according to claim 3, further configured to:
   determine a value for the road type of each of the at least two turning-off possibilities for the motor vehicle; and
   select the one of the at least two turning-off possibilities with the highest value for the road type.

5. The driver assistance system according to claim 1, further configured to:
   detect the turning-off request of the driver of the motor vehicle during operation of the motor vehicle with automated longitudinal guidance; and
   reduce the speed of the motor vehicle in accordance with the detected turning-off request.

6. A method for the automated longitudinal guidance of a motor vehicle, the method comprising:
   detecting of at least one turning-off possibility for the motor vehicle in a partial region of a driving route lying in front of the motor vehicle in a direction of travel of the motor vehicle;
   determining a location of a first end of the partial region dependent on a first predefined vehicle deceleration rate;
   determining a location of a second end of the partial region dependent on a second predefined vehicle deceleration rate different from the first predefined vehicle deceleration rate; and
   decreasing a speed of the motor vehicle in a manner that is dependent on the at least one detected turning-off possibility.

7. The method according to claim 6, further comprising:
   detecting at least two turning-off possibilities for the motor vehicle; and
   selecting one of the at least two turning-off possibilities for the motor vehicle as the at least one detected turning-off possibility.

8. The method according to claim 7, further comprising:
   determining a road type for each of the at least two turning-off possibilities for the motor vehicle; and
   selecting the one of the at least two turning-off possibilities dependent on the respective road types of the at least two turning-off possibilities.

9. The method according to claim 8, further comprising:
   determining a value for the road type of each of the at least two turning-off possibilities for the motor vehicle; and
   selecting the one of the at least two turning-off possibilities with the highest value for the road type.

10. The method according to claim 6, further comprising:
    detecting the turning-off request of the driver of the motor vehicle during operation of the motor vehicle with automated longitudinal guidance; and
    reducing the speed of the motor vehicle in accordance with the detected turning-off request.

11. The method according to claim 6, further comprising:
    detecting a lane change request of the driver and detecting the turning-off request of the driver based on one or more activations of a direction of travel indicator by the driver; and
    differentiating the lane change request from the turning-off request based at least on one of:
    a present lane in which the motor vehicle is present being driven in,
    a duration of time that the direction of travel indicator is activated by the driver,
    a number of times that the direction of travel indicator is activated by the driver, and/or
    a level of activation of the direction of travel indicator by the driver.

12. The method according to claim 6, further comprising:
    determining a lane in which the motor vehicle is presently being driven in from among a plurality of possible lanes in which the motor vehicle may be driven in; and
    determining that the at least one turning-off possibility for the motor vehicle is permitted in the lane in which the motor vehicle is present being driven in.

* * * * *